United States Patent

Restivo

[15] 3,705,352
[45] Dec. 5, 1972

[54] TESTING SYSTEM FOR MOTOR DRIVEN APPARATUS
[72] Inventor: Frank S. Restivo, Randallstown, Md.
[73] Assignee: Westinghouse Electric Corporation, Pittsburgh, Pa.
[22] Filed: Feb. 25, 1971
[21] Appl. No.: 118,810

[52] U.S. Cl.........................324/158 MG, 324/73 R
[51] Int. Cl.........................G01r 15/00, G01r 15/12
[58] Field of Search.........324/158 R, 158 MG, 73 R; 318/490

[56] References Cited

UNITED STATES PATENTS 1,609,433  12/1926  Seeger..............................324/158 R
3,435,328   3/1969  Allen................................324/158 R
2,503,213   4/1950  Philbrick..........................324/158 R Primary Examiner—Rudolph V. Rolinec
Assistant Examiner—Ernest F. Karlsen
Attorney—F. H. Henson, E. P. Klipfel and D. Schron

[57] ABSTRACT

A test system which replaces the traction motors of a transit car with an analog equivalent thereof operable at a much lower voltage rating than the motors. The system provides a similarly scaled down power supply as well as amplifiers for providing the transit car's controller with a sensed motors current equivalent to a normal operating condition.

13 Claims, 16 Drawing Figures

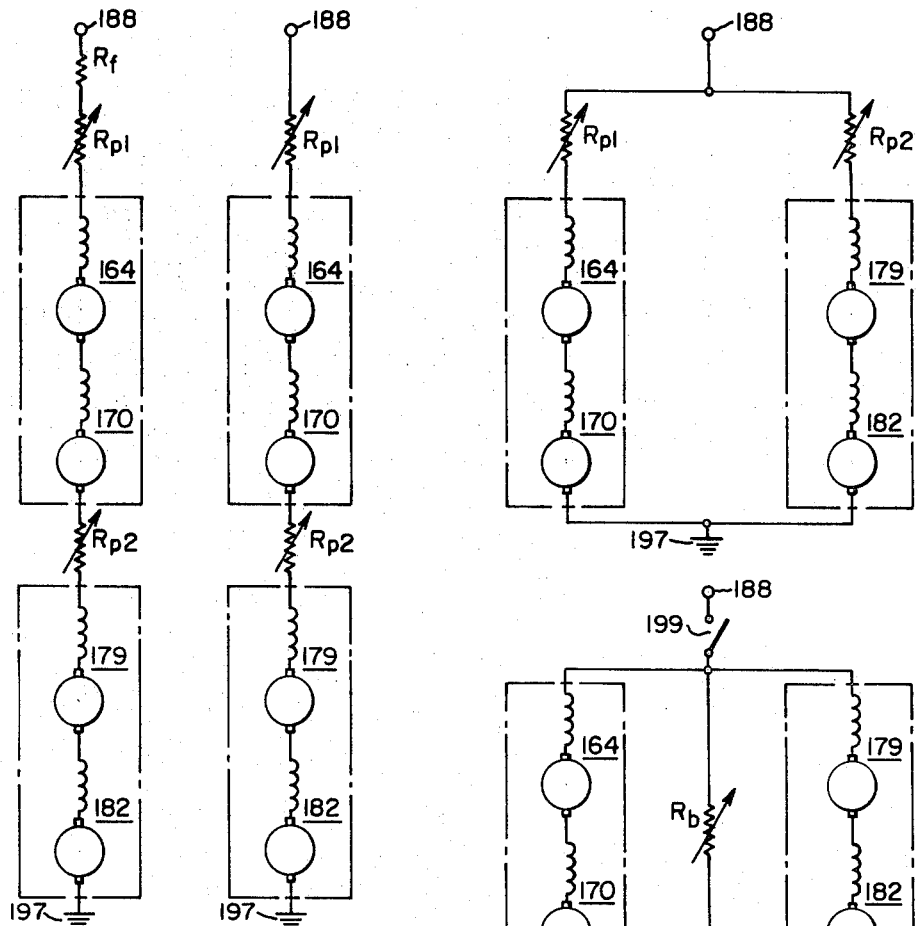
FIG.8C
FIG.8D
FIG.8A    FIG.8B
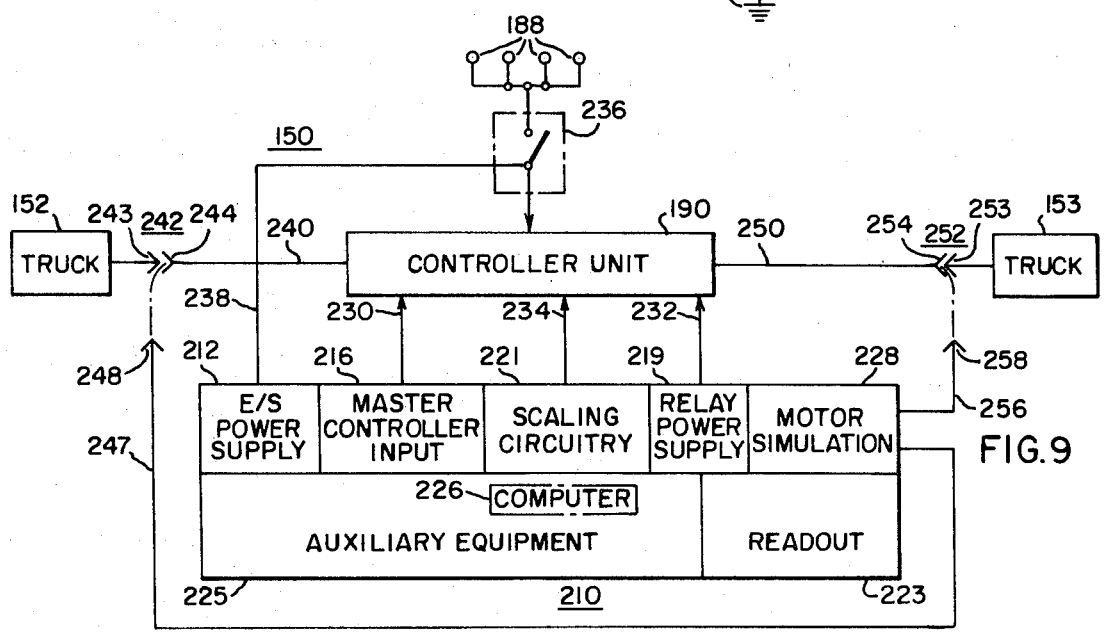
FIG.9

3,705,352

TESTING SYSTEM FOR MOTOR DRIVEN APPARATUS

BACKGROUND OF THE INVENTION

1. Field of the Invention

The invention in general relates to testing equipment, and particularly to equipment for testing the controller package of high voltage motor driven apparatus such as rapid transit cars.

2. Description of the Prior Art

In the field of rail transportation, rapid transit cars use a sophisticated electronic and electromechanical propulsion control package which performs many control functions in the operation of the cars. In a typical propulsion controller unit, hundreds, or thousands of pounds of high current-high voltage electrical circuits, electromechanical controls, and electronic control circuitry are packaged in a large unit mounted under each transit car and wired to associated components such as traction motors, operator control console, batteries, third rail voltage pickup, power and braking resistor grids, etc.

After a component failure and for routine maintenance operation, it is necessary to verify the proper functional operation of the car apparatus, and particularly its controller unit, with regard to for example acceleration rates, dynamic braking rates, speed control, armature currents, etc.

Basically, there are two approaches to the testing of such apparatus, the static or circuit check technique and the dynamic or operational checkout method. In the static technique each and every component of the apparatus is tested and if the results are within an allowable tolerance it is assumed that the system will operate properly. This technique may be useful where there are relatively few components, however a transit car is a complex system utilizing a great number of different components with many feedback loops responding to a large number of variables. In addition, this technique requires that all independent circuit points be made available in order to gain access to the component parts of the apparatus under test. For transit car testing this would require that a complex wiring harness with connector terminations be installed in each car and would add a considerable amount to the basic cost of the unit because of required engineering design changes, additional material and installation requirements.

The second, or dynamic test method exercises the system under actual operating conditions and thereby directly monitors the performance against the design requirements. In one dynamic test operation a section of actual track is used to run the car under test through all of its acceleration and braking modes in order to evaluate its performance. Often this is difficult since the track is being utilized for tightly scheduled revenue runs and each time an adjustment or calibration is made, the car must be taken out and brought back for readjustments. If repairs or adjustments are not made correctly an actual test run could result in additional damage to the equipment or operating personnel, and such testing requires loading and unloading of all test equipment on board each car before and after the test runs.

To eliminate these objections another dynamic approach is utilized wherein the car is brought into the maintenance shop onto a set of rollers which are mechanically linked to a flywheel, the inertia of which is designed to simulate the car under normal operation. The car is then exercised under full power and traction motor torque utilized to accelerate the flywheel. For the testing of dynamic braking, the flywheel's angular momentum would simulate the kinetic energy of the car. The flywheel approach however requires an elaborate and costly installation, is difficult to accomplish mechanically, and exhibits an extremely high noise level. The technique is objectionable from a safety point due to the presence of high voltages and currents, rotating car wheels, contact rollers and flywheel.

In the present invention all dynamic tests are performed with the transit car at a standstill in the test and maintenance facilities and requires a minimum of modifications to the existing controller unit.

SUMMARY OF THE INVENTION

The present invention is directed to a testing system for motor driven apparatus utilizing high voltage motor means, sensing apparatus for sensing motor current, and a controller for controlling the motor means in response to sensed motor current. The testing system includes a relatively low voltage supply which is a fraction of the high voltage normally used to drive the apparatus. The high voltage is disconnected and replaced with this lower voltage. A simulated motor means is provided and is designed to function at the lower voltage ratings. The motor means of the apparatus is disconnected and the simulated motor means is inserted in its place. An amplifier means amplifies the sensed simulated motor current and provides the controller with a sensed current, equivalent to the current the controller normally receives during actual operations with the high voltage motor means.

BRIEF DESCRIPTION OF THE DRAWINGS

FIGS. 8A to 8D illustrate the motors of FIG. 7 in various configurations determined by the controller unit;

FIG. 9 is a block diagram illustrating the testing system and its connective relationship with the transit car of FIG. 7;

DESCRIPTION OF THE PREFERRED EMBODIMENT

Figure 1:
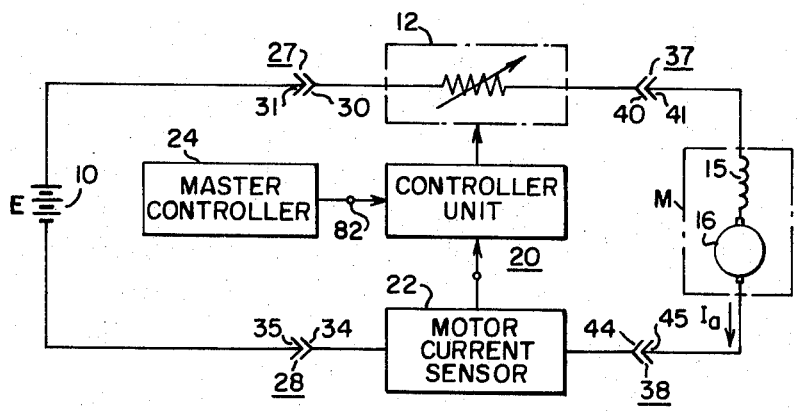
FIG. 1 is a block diagram of a typical motor driven apparatus utilizing a controller unit.

FIG. 1 serves to basically illustrate the various components of a controlled motor driven apparatus. A relatively high voltage source 10 of magnitude E provides energy to a motor means M by way of current control means 12 for driving a load. For simplicity the motor means M is illustrated as a single series motor having a field winding 15 and an armature 16. The voltage E is relatively high and the resistance of the field winding and armature 16 is extremely low. If the motor were connected directly to the high voltage source 10 the resulting current through the motor would be too large for both the motor and the entire system. Accordingly resistance must be connected in series with the motor armature when starting and this resistance may be gradually cut out as the armature comes up to speed and develops a counter, or back electromotive force (EMF).

The controller unit 20 is responsive to sensed motor current $I_a$ for controlling the motor, and particularly the current being supplied to the motor. Motor current, such as armature current $I_a$ is sensed by a motor current sensor 22 which may physically be a part of the controller unit 20, and in response thereto, the controller unit 20 governs the current control means 12 shown simply as a variable resistor. For high voltage applications, this variable resistor in actuality is a resistor grid or bank comprising a plurality of large resistors which are periodically removed from the circuit by the controller unit 20. For pure electronic control, the current control means 12 could be a DC chopper or pulse providing circuit with the ratio of ON to OFF time of the pulses being governed by the controller unit 20 in response to sensed motor current.

Input commands to the controller unit 20 are provided by a master controller 24 which in most instances will be operator controlled, or in some applications, computer controlled.

The high voltage source 10 is connected in circuit at terminals 27 and 28 by means of connector members 30–31 and 34–35. The motor means M is connected in circuit at terminals 37 and 38 by means of connector members 40–41 and 44–45.

Figure 2:
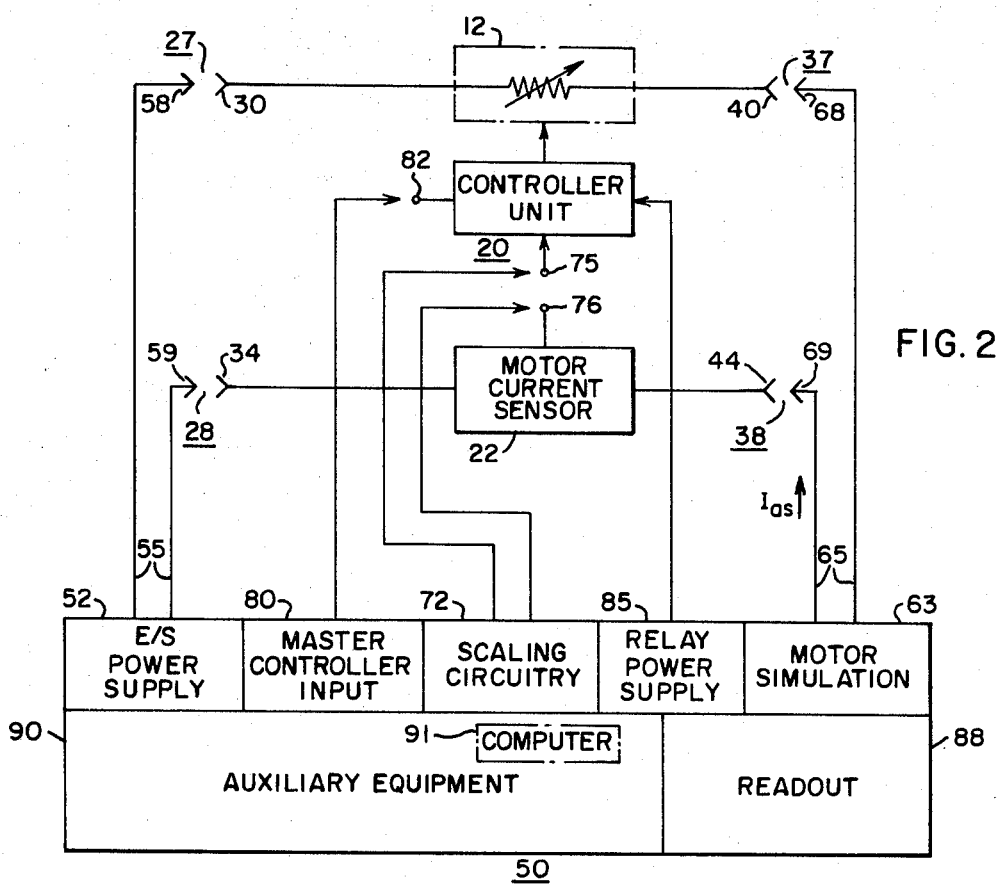
FIG. 2 is a block diagram illustrating the present testing system in conjunction with the apparatus of FIG. 1.

The testing system 50 of the present invention, as illustrated in FIG. 2 is for motor driven apparatus such as illustrated in FIG. 1, and portions of FIG. 1, with the same reference numerals, have been repeated in FIG. 2. The testing system 50 of the present invention includes a relatively low voltage supply 52 which replaces the relatively high voltage supply 10 and which is connected into the circuit such as at terminals 27 and 28 by means of cable or conductor means 55 and connector members 58 and 59. The high voltage source 10 which is removed from the circuit has a magnitude of E and the power supply 52 provides a voltage scaled down by a magnitude S such that its value is E/S.

The motor means M is disconnected from the circuit and is replaced at terminals 37 and 38 with a simulated motor 63 by means of cable or conductor means 65 and connector members 68 and 69.

Figure 3:
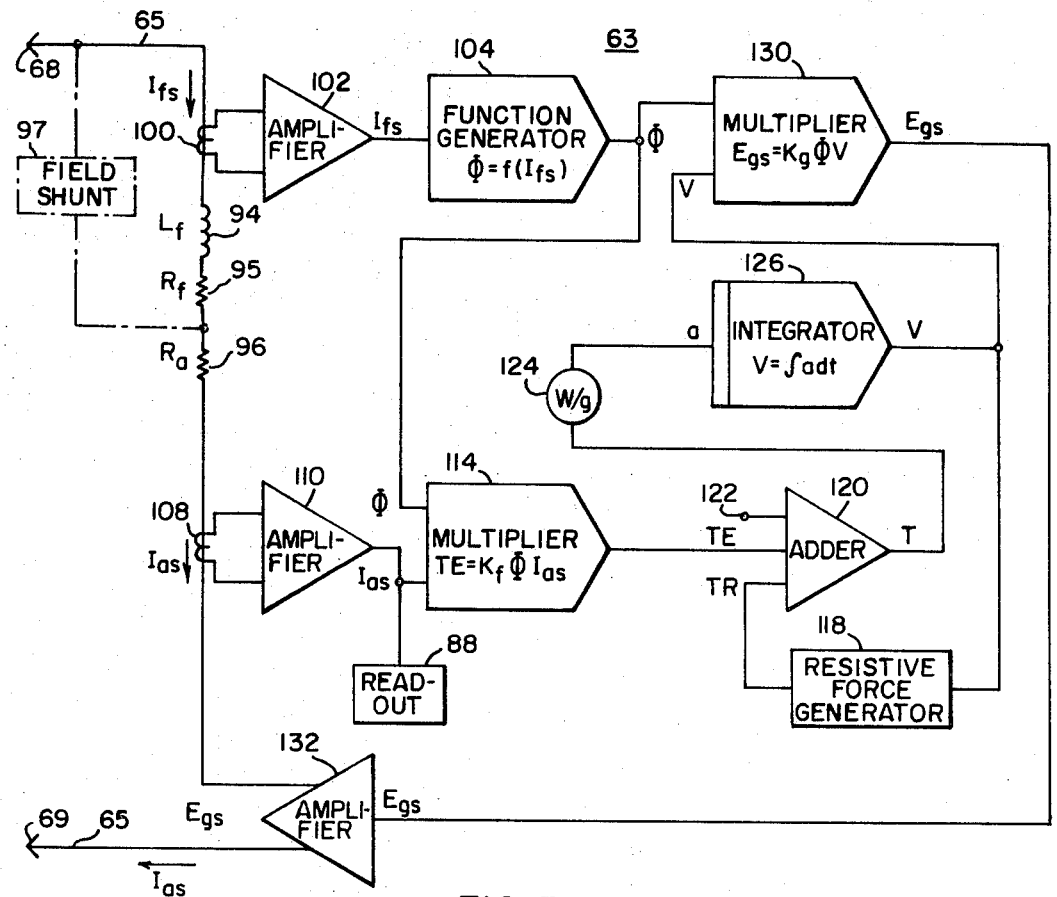
FIG. 3 is a circuit diagram of an analog simulation of the motor of FIG. 1.

The simulated motor 63 is designed to operate at the reduced power supply voltage E/S. The simulated motor, which will be described in more detail in FIG. 3, provides a motor current which is scaled down in value from the normal motor current and is designated $I_{as}$.

The motor current sensor 22 senses the reduced motor current and will provide a sensing signal to the controller unit 20. Accordingly, the testing system 50 includes means for scaling sensed simulated motor current for providing the controller with a sensed current equivalent to normal operation with the high voltage motor means. For this purpose, scaling circuitry 72 is inserted into the motor driven apparatus such as by breaking the connection from the motor current sensor 22 to the controller unit 20 at terminals 75 and 76.

The testing system 50 may conveniently be packaged in a single unit and brought to the apparatus to be tested. In order to be able to conduct all testing procedures at the testing unit it is preferable that provision is made for inputting commands to the controller unit 20. Accordingly there is provided a master controller input 80 connectable with the controller unit 20 at terminal 82 and which replaces the apparatus master controller 24 (FIG. 1).

Many controller units in addition to electronic circuitry include electromechanical circuitry operated by relays. The relays are low voltage relays supplied with power from an apparatus carried power supply such as a battery. The testing system 50 therefore includes a relay power supply 85 which replaces the normal relay power supply of the apparatus.

With all connections made, and in operation, various parameters are monitored and supplied to readout circuitry 88 for evaluation purposes. In addition, in the auxiliary equipment section 90 there may be included a small digital computer 91 for performing automatic evaluation and for controlling test sequences. The simulated motor 63 of FIG. 2 is illustrated in more detail in FIG. 3.

Basically, the simulated motor is responsive to various parameters for developing a back EMF, $E_{gs}$, in response thereto. Several elements of FIG. 2 are repeated in FIG. 3, namely the conductor means 65, connector members 68 and 69, and the readout section 88. The motor replaced has a field winding 15 and this field winding is represented by inductor 94 having an inductance value of $L_f$ with resistance 95 being equivalent to the field winding resistance $R_f$. The inductance of the armature winding is substantially negligible and has been omitted however the armature resistance is represented by resistor 96 having a value of $R_a$. For some applications the field winding may have field shunting means 97, shown dotted, however, to simplify the explanation such field shunting means will be omitted, therefore making simulated field current $I_{fs}$ equal to simulated armature current $I_{as}$.

Figure 4:
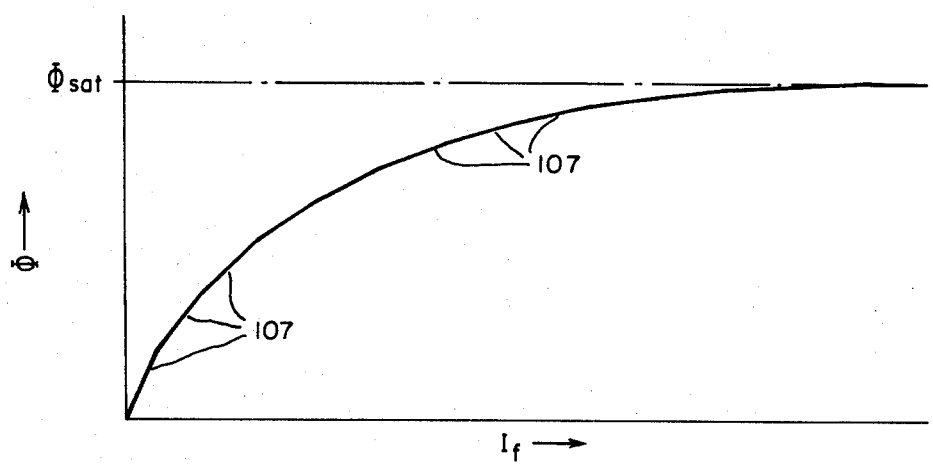
FIG. 4 is a curve illustrating the relationship between flux and field current of a motor.

In the motor being simulated the flux $\phi$ depends upon the field current $I_f$ and means are provided for deriving a signal indicative of $\phi$. The means includes current sensor 100 which senses $I_{fs}$ and provides an indication thereof to amplifier 102, the output of which, $I_{fs}$, is received by the function generator 104 operable to provide an output $\phi$ as a function of input current $I_{fs}$ ($\phi = f(I_{fs})$). For the motor being replaced, this function is known and may be duplicated. For example and with reference to FIG. 4, there is illustrated the saturation curve of the particular motor being replaced. The horizontal axis represents field current and the vertical axis represents flux $\phi$. It is seen that as the field current increases the flux $\phi$ increases and levels out to a saturation value $\phi_{sat}$. Function generators, well known to those skilled in the art, can duplicate such a curve one method being by successive straight line approximations as indicated by straight line sections 107.

Referring back to FIG. 3, the electric analog of the motor is further based upon the facts that the motor counter EMF is proportional to motor flux and speed, and that the torque or tractive effort is proportional to flux and armature current. Mathematically stated, $$E_g = K_g \phi V$$

where:

$E_g$ = motor counter EMF $K_g$ = known voltage constant of motor $\phi$ = flux

V = speed and $$TE = K_f \phi I_a$$

where:

TE = tractive effort $K_f$ = the known tractive effort constant of the motor $\phi$ = flux $I_a$ = armature current.

Since the tractive effort is dependent upon armature current, amplifier 110 is provided and is connected to armature current sensor 108 for providing an output signal $I_{as}$ indicative of armature current.

Figure 10:
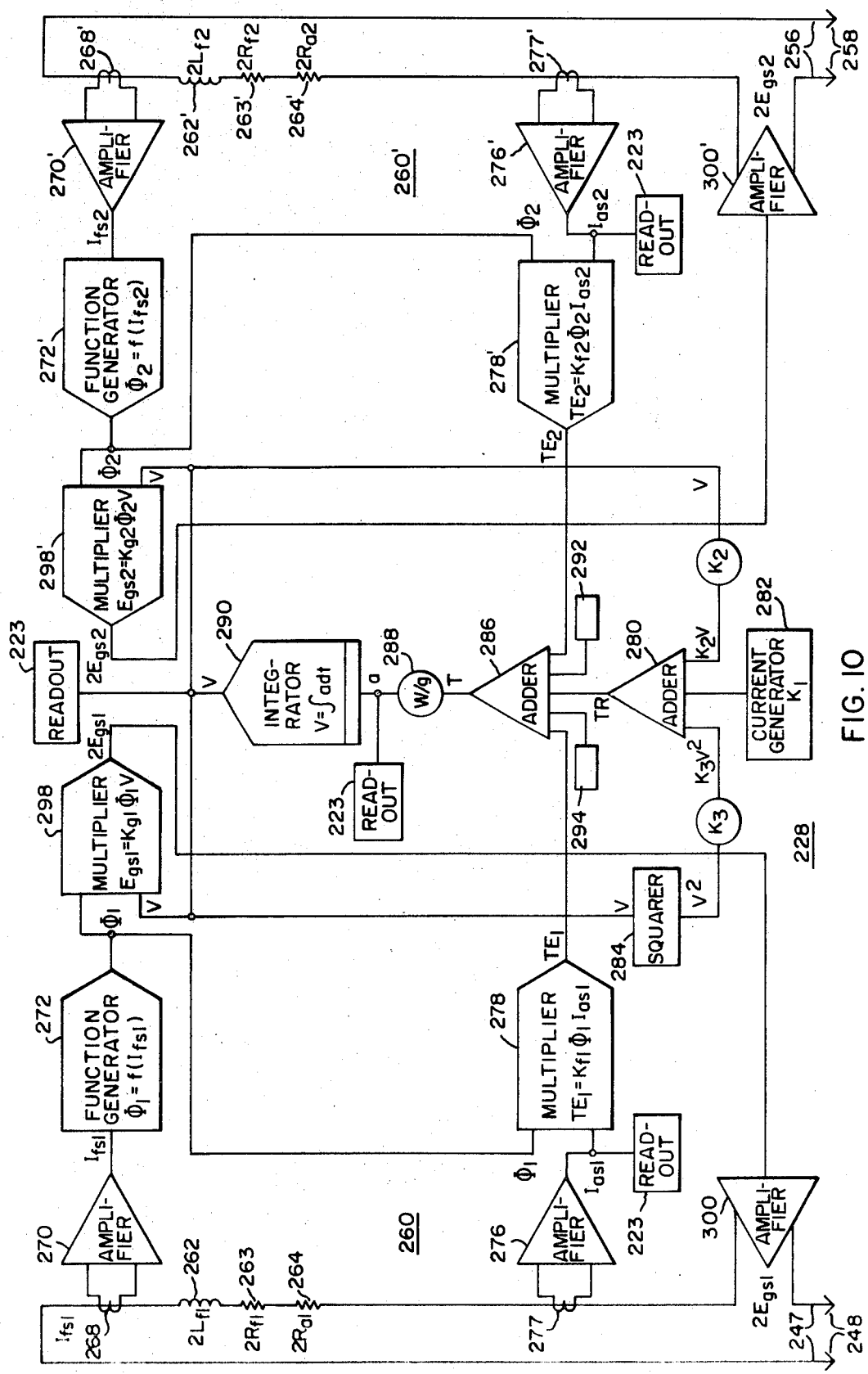
FIG. 10 illustrates the electrical analog for motor simulation utilized for the testing system illustrated in FIG. 9.

The multiplier 114 is responsive to input $I_{as}$ and input signal $\phi$ from function generator 104 and is operable to combine these signals to implement the equation for tractive effort. Associated with the load being driven are certain resistive forces which subtract from the tractive effort of the motor. One type of resistive force is dependent upon speed and accordingly a resistive force generator circuit 118 receives a speed input signal and provides an output signal TR which is subtracted from TE in adder circuit 120. Adder circuit 120 includes an additional input 122 to which may be applied other signals indicative of other resistive forces, and dependent upon the apparatus tested. A particular example of a resistive force generator circuit will be described with respect to FIG. 10.

Knowing the load to be driven, a circuit means 124, which may be a resistor, is made proportional to the mass of the load. The net tractive effort T from adder 120 is equivalent to a net force which when divided by the value of mass W/g yields an acceleration value $a$, from the well known relationship F = ma. Motor speed V may then be obtained by integrating the value of acceleration $a$ in the integrator 126. The signal V, indicative of speed, is provided not only to the resistive force generator circuit 118 but is also provided to multiplier circuit 130, the other input of which is flux $\phi$ from function generator 104. Multiplier circuit 130 combines the input signal according to the motor relationship $E_g = K_g \phi V$ to provide an output signal $E_{as}$ indicative of back EMF and which may be suitably scaled in amplifier means 132. Various parameters may be monitored, and by way of example, the read-out means 88 is connected to receive the output of amplifier 110, indicative of armature current.

Figure 5:
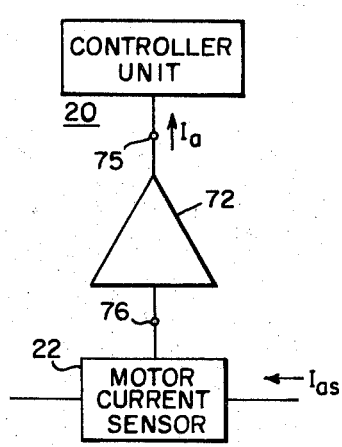
FIG. 5 is a block diagram of a portion of FIG. 2 illustrating a current amplification function.

Just as the motor M it replaces provides a motor current and generates a back EMF, so does the simulated motor 63, except at respective scaled down values. In order for the controller unit 20 to operate properly it must be responsive to the values of current it would normally encounter with the high voltage motor in the circuit. In FIG. 2 the scaling circuitry 72 provided this function. It is shown in FIG. 5 as an amplifier 72 which amplifies the scaled motor current $I_{as}$ sensed by the motor current sensor 22 to a value indicative of $I_a$ and provides it to the controller unit 20. The scaling circuitry 72 in effect is dependent upon the type of motor current sensor utilized. For example, for a current sensor such as 100 in FIG. 3, the scaling circuit may be connected as illustrated in FIG. 5.

Figure 6:
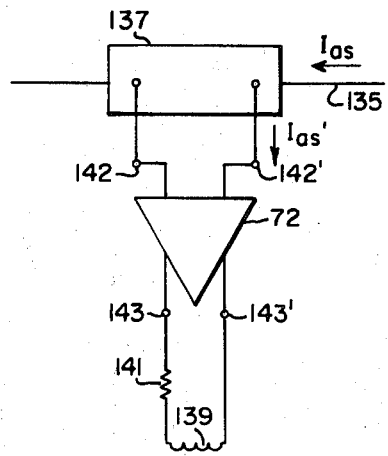
FIG. 6 is a circuit diagram illustrating another type of amplification function.

Another arrangement is illustrated in FIG. 6. Let it be assumed that line 135 normally carries motor current $I_a$ of, for example, 400 amperes. A shunt 137 as part of the controller unit is interposed in the line 135 and connected to the shunt is a winding 139 of a magnetic amplifier control circuit. In series with the winding 139 is a resistor 141, the shunt 137 arrangement being such that in response to a current $I_a$ the current in the winding loop may be less than 1 amp. In normal operation terminals 142, 142' are directly connected to terminals 143, 143' respectively. When the high voltage motor is replaced by the simulated motor of FIG. 3, line 135 carries the simulated motor current $I_{as}$ which may be in the order of 8 amperes as opposed to several hundred amperes. The scaling circuitry 72 is inserted between terminals 142, 142' and 143, 143' and amplifies the milliampere current $I_{as}$, from shunt 137 to a value normally seen by the magamp winding 139.

The testing system finds application with various motor driven apparatus such as street car, locomotives, cranes, etc. In a preferred embodiment the testing system is constructed and arranged to perform tests on the apparatus as illustrated by way of example in FIG. 7 to which reference is now made.

Figure 7:
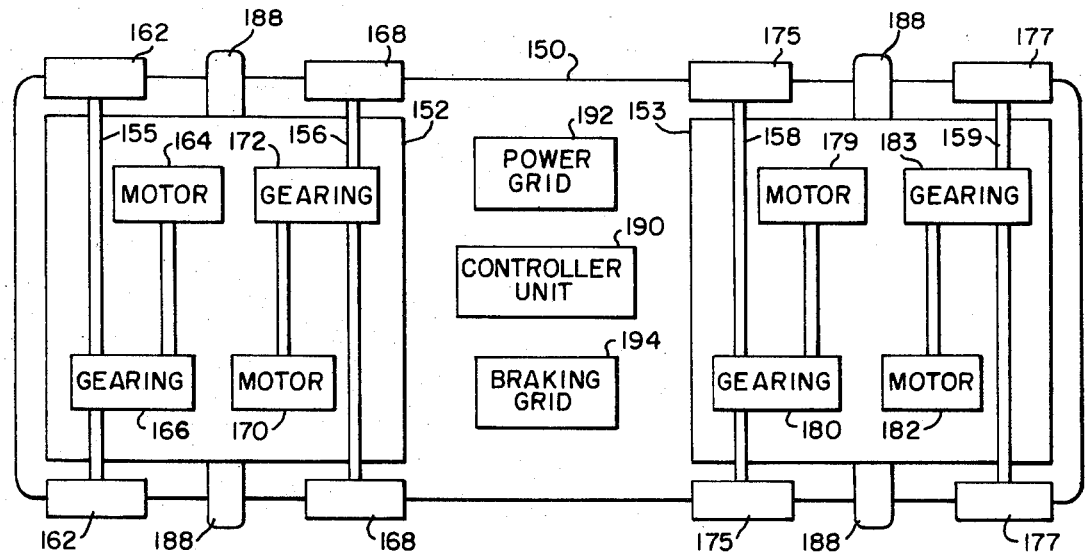
FIG. 7 is a plan view-block diagram of various components of a typical rapid transit car.

FIG. 7 basically illustrates in plan view various components of a rapid transit car 150. The car 150 includes trucks 152 and 153 each carrying two axles, 155 and 156 for truck 152 and 158 and 159 for truck 153. Axle 155 connected to wheels 162 is driven by motor 164 through gearing 166. The other axle 156 connected to wheels 168 is driven by motor 170 through gearing 172. Similarly for truck 153, axles 158 and 159 connected to wheels 175 and 177 are driven by respective motors 179 connected through gearing 180 and motor 182 connected through gearing 183.

Power for the motors is obtained by means of pads 188 which contact the third rail, and control of power to the motors is by means of the controller unit 190. Basically, in response to a command from the master controller (not shown in FIG. 7) as well as in response to motor current, the controller unit serves to successively cut out resistances in the power grid 192 for motor regulation. In the dynamic braking mode of operation, the controller unit 190 is operable to successively vary the braking resistance by successively cutting out resistances in the braking grid 194. The controller unit 190 has many functions among which is the control of motor starting, regulation of speed and acceleration as well as dynamic braking and regulation of motor shunting. The motors on each truck are generally controlled as a pair and another function of the controller unit is to physically configure the motor circuits for different modes of operation, as illustrated in FIGS. 8A to 8B, each being commanded by an input from the master controller.

FIG. 8A illustrates a switch mode wherein the motor pair 164, 170 and its associated power grid represented by resistance $R_{p1}$ is in series with the other motor pair 179, 182 and its power grid represented by resistance $R_{p2}$. A fixed resistor $R_f$ completes the series circuit between the high voltage input at pad 188 and ground 197. The fixed resistance $R_f$ has the effect of limiting the current to the motor pairs and accordingly limiting the speed of the transit car to around 5 miles per hour (mph) for example.

A next higher speed, for example 25 mph, may be obtained by the operator commanding the series mode as illustrated in FIG. 8B which is the same as the arrangement of 8A except that the fixed resistor $R_f$ is removed from the circuit.

High speeds are obtained by commanding the parallel configuration of FIG. 8C. If the operator initially commands the high speed mode of operation, the controller unit will configure the motor pairs in the sequence illustrated from FIGS. 8A to 8C.

In the dynamic braking mode of FIG. 8D, the controller will interrupt the circuit between high voltage and ground, for example by opening switches 199 and 200, and insert the raking grid represented by resistor $R_b$ and thereafter control the resistance value through the dynamic braking phase.

FIG. 9 illustrates a testing system 210 for use with the apparatus illustrated in FIG. 7. Various portions of FIG. 7 have been omitted or simplified for the showing in FIG. 9. The testing system 210 is similar to that illustrated in FIG. 2 and includes a low voltage supply 212 which replaces the third rail high voltage. As an example, the train may be supplied with a voltage of 600 volts and the scaling factor S may have a value of 50 so that the power supply 212 provides a 12 volt input to the apparatus (i.e. a 50:1 ratio).

The testing system, additionally includes the master controller input 216, the relay power supply 219, the scaling circuitry 221, readout means 223, and the auxiliary equipment 225 with computer 226, as in FIG. 2. Since the transit car includes two motor pairs, one on truck 152 and the other on truck 153, the motor simulation circuit 228 of testing system 210 includes a first section for simulating the motor pair on truck 152 and a second section for simulating the motor pair on truck 153.

In operation, the car 150 is brought to a testing station such as a maintenance shop where the testing system 210 is located. Lines 230, 232 and 234 are utilized to connect the master controller input, relay power supply, and scaling circuitry with the controller unit 190. If the car is of the type which provides the high voltage at pads 188 to the apparatus through a knife switch such as 236, this knife switch may be opened and the 12 volt supply connected as illustrated by way of line 238.

Motor lines 240 connect the controller unit 190 with the motor pair on truck 152 by means of coupler 242 having coupler members 243 and 244. The coupler 242 is disconnected and the first section of motor simulation 228 is connected to the apparatus via lines 247 and coupling member 248 coupling to member 244.

Similarly, motor lines 250 connect the motor pair on truck 153 to the controller unit 190 by way of coupler 252 having coupler members 253 and 254. The coupler 252 is disconnected and the second section of motor simulation is connected via lines 256 and coupling member 258 to coupling member 254. The motor simulation circuitry 228 is illustrated in more detail in FIG. 10.

The operation of the motor simulation circuitry 228 is essentially the same as previously illustrated in FIG. 3, except that there is provided two motor simulation sections with some circuitry for deriving speed being common to both sections. More specifically, the first section 260 includes an inductor 262 and resistor 263 equivalent to the inductance and resistance of the field windings of the motor pair (164, 170). Accordingly these components have respective values of $2L_{f1}$ and $2R_{f1}$, the subscript 1 designating the first motor pair. The armature resistance of the motor pair is represented by resistor 264 having a value of $2R_{a1}$. For the motor pair arrangement, and in the absence of field shunting, the current through the field and armature of one motor is the same as the field and armature current of the other motor of the pair. The equations previously described for motor simulation are applicable and accordingly there is provided a current sensor 268 for sensing field current designated $I_{fa1}$. Amplifier 270 receives the signal from he current sensor 268 to provide a signal indicative of field current to the function generator 272 which is constructed and arranged to provide an output signal $\phi_1$ indicative of the total flux in both motors of the pair. Alternatively, the $\phi$ of the motor may be derived and remaining operations may be scaled accordingly as would be apparent to one skilled in the art.

Amplifier means 276 senses the armature current signal from sensor 277 and provides an output signal $I_{as1}$ indicative thereof. The total tractive effort due to the motor pair is proportional to the flux and armature current and a signal $TE_1$ indicative of this tractive effort is provided by the multiplier circuit 278 which receives the output flux signal from function generator 272 and the output armature current signal from amplifier 276.

Circuit counterparts in the second motor simulation section have been given identical, but primed reference numerals. The signals provided in the second motor simulation section 260' are designated with a subscript 2. The tractive effort $TE_2$ of the second motor pair is provided by he multiplier circuit 278' which receives the $\phi_2$ output from function generator 272' and the armature current signal $I_{as2}$ from the amplifier 276'.

In FIG. 3 there was included a resistive force generator circuit 118. In the present example of rapid transit car testing, the restraining forces are known to be caused by three different phenomena rolling friction, bearing friction and aerodynamic drag. Rolling friction is usually a constant restraining force and may be simulated by a fixed current input. Bearing friction usually varies linearly with motor angular velocity V and aerodynamic drag varies as the square of this velocity. Mathematically stated, $TR = K_1 + K_2V + K_3V^2$ where:

$TR$ = the total restraining force $K_1$ = the rolling friction constant $K_2$ = the bearing friction constant $K_3$ = the aerodynamic friction constant $V$ = angular motor velocity.

For a particular transit car the value of the constants are known, and to obtain TR, there is provided an adder circuit 280 which receives as one input a signal indicative of $K_1$ from current generator 282. The signal V is modified by $K_2$ to form a second input to the adder and as a third input the signal V is squared in squaring circuit 284 and the resultant signal $V^2$ is modified by the $K_3$ constant.

Adder 286 combines all of the additive and subtractive forces to provide a net tractive force output T. The mass of the car represented by circuit element 288 is utilized to derive an acceleration signal "a" from the relationship $F = ma$ and the acceleration signal is provided to integrator 290 the output of which is a signal indicative of motor speed V. When the transit car is making an actual run, all four motors are geared to the track and are forced to go at the same speed and respond as a unit. Hence, in the motor simulation circuit the signal V is representative of the angular velocity of each motor. If there is slipping or sliding the net effect will be to add a resistive force and accordingly there is provided another input 292 to the adder 286 to simulate a slip-slide condition. An additional input 294 is preferably provided to supply an additional subtractive force such as might be encountered if the transit car climbs a grade.

The back EMF for the motors of the first motor pair is generated by multiplier 298 receiving the flux signal from function generator 272 and the speed signal from integrator 290. The back EMF signal $2E_{as1}$ is suitably amplified in amplifier 300. The back EMF signal $2E_{as2}$ for the motors of the other motor pair is provided by multiplier 298' and is amplified by amplifier 300'.

Testing for acceptable operation is performed by monitoring and evaluating the controller response to simulated motor currents through all phases of acceleration, velocity and braking, including simulation of slip-slide conditions. Should some components fail when the controller is cutting out resistances in the power grid, the failure will be detected by evaluation of the recorded simulated motor response. To obtain this recorded response, the readout means 223 is connected to receive the simulated armature current of the first motor pair from amplifier 276 and the simulated armature current from the second motor pair from amplifier 276'. An indication of motor speed is obtained by sampling the output of integrator 290 and an indication of acceleration is obtained by sampling its input. The readout means may be in the form of meters, strip recorders, or other output devices or combinations of them.

Figure 11:
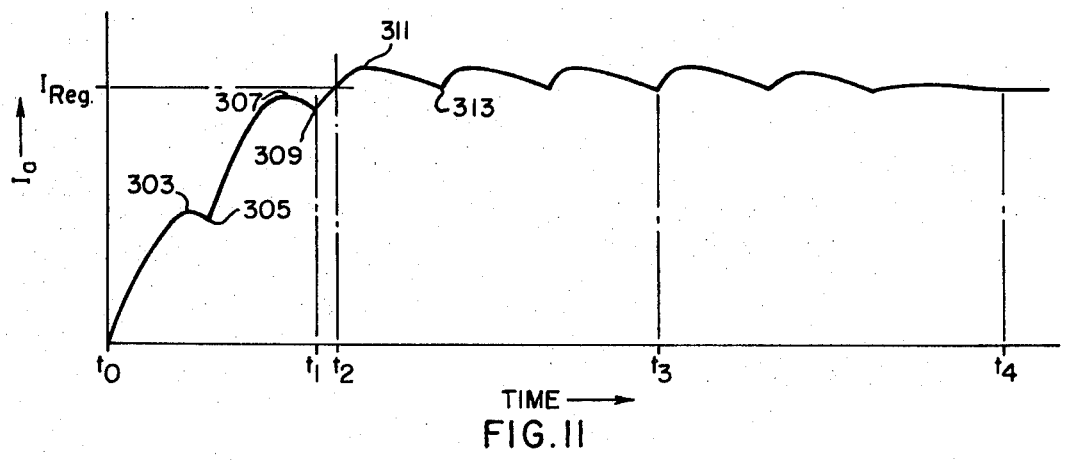
FIGS. 11 and 12 are curves illustrating typical read outs for the testing system.
Figure 12:
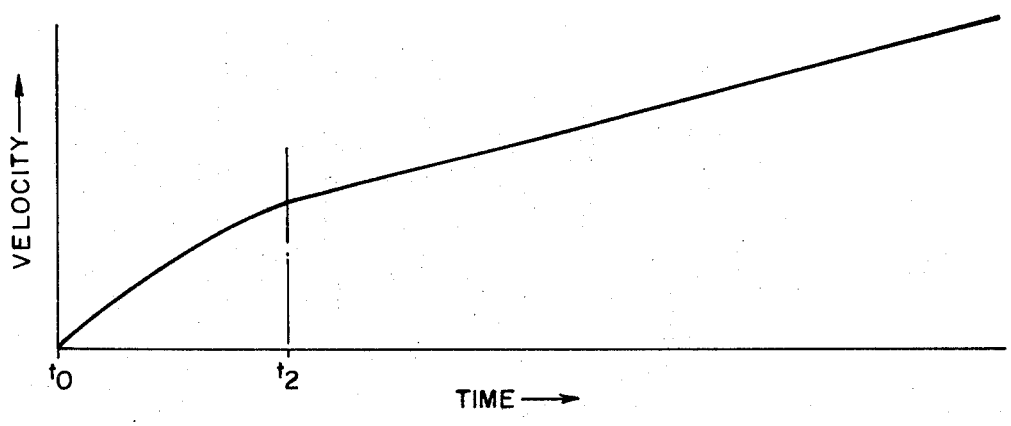

FIGS. 11 and 12 illustrate two typical readouts, FIG. 11 being a plot of armature current versus time and FIG. 12 being a plot of velocity versus time. FIG. 11 is typical of the readout of amplifier 276 of FIG. 10, for an acceleration mode of operation. The actual transit car motors are designed to operate at a certain regulation current and this current is represented in FIG. 11 by the value $I_{reg}$. At time $t_0$ the apparatus is commanded to accelerate to maximum speed by a command from the master control input 216 (FIG. 9) initiated by an operator or by the computer 226 of the auxiliary means 225, if provided. In response to the command, the controller configures the motor pairs and inserts fixed resistance means as illustrated in FIG. 8A. For smoother operation, resistance means $R_f$ may be comprised of two or more fixed resistances which are taken out of the circuit by the controller as speed increases. Due to circuit inductance, the armature current in FIG. 11 is seen to increase non-linearly to a maximum at point 303. During this time the increasing current increases the speed of the motors which in turn increase the back EMF. This increase in back EMF tends to reduce the armature current as seen by the decreasing portion of the curve from point 303 to notch point 305. The current would decrease further as the back EMF builds up however at point 305 the controller unit removes another fixed resistance thereby increasing the current to a maximum point 307 after which the back EMF decreases the current to notch point 309.

At time $t_1$ corresponding to point 309, the controller unit operates to remove the remaining fixed resistance such that the motor circuit is identical to that illustrated in FIG. 8B. The controller unit, generally a cam controller portion thereof, takes over the operation of removing power grid resistance ($R_{p1}$ and $R_{p2}$). After the removal of the fixed resistances the current increases to another maximum point 311 after having gone past the regulation current value, at time $t_2$. Again, the increase in current and speed causes an increase in back EMF tending to decrease the armature current back to a notch point 313 around the regulation current and at which time resistance is switched out by the controller to repeat the process.

Each notch point represents another resistance switched out by the controller and at time $t_3$ when all resistances have been switched out in the configuration of 8B, the controller unit will reconfigure the motors to the arrangement illustrated in FIG. 8C with resistances $R_{p1}$ and $R_{p2}$ again inserted in the circuit. The process of current buildup and subsequent decay due to increasing back EMF continues and successive resistances are switched out up until time $t_4$ where all resistance has been cut out by the controller and each motor pair is directly across the full line voltage.

FIG. 12 illustrates the motor velocity (which may be directly correlated with transit car velocity). The velocity builds up in a curvilinear fashion from time $t_0$ to time $t_2$ where, it will be remembered the armature current reached the designed regulation value. Thereafter, the velocity increases substantially linearly with the slope thereof being equivalent to the constant designed acceleration.

Deviation of the curves of FIGS. 11 and 12, from designed limits, or deviation from a known general shape, for example the absence of a bump in the $I_a$ curve indicating a malfunction, may be visually observed and corrective maintenance applied. Additionally, or alternatively, the computer section may be utilized to analyze the various outputs and in response thereto provide a computer readout indicative of possible maintenance to be performed.

Figure 13:
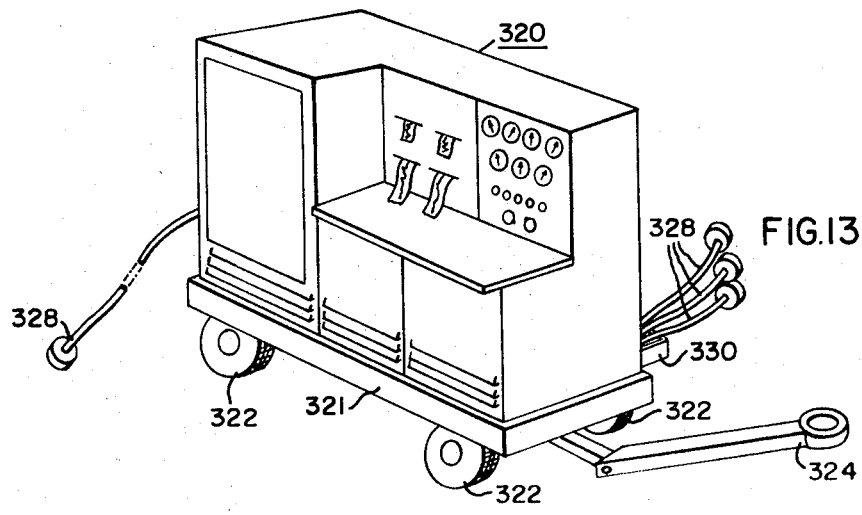
FIG. 13 illustrates the packaging arrangement for the testing system.

The testing system as illustrated in FIG. 9 may be permanently installed in the transit car maintenance complex. Another arrangement which adds versatility and mobility to the system is illustrated in FIG. 13. The testing system is housed in a compact and ruggedized enclosure 320 supported on a rigid steel platform 321 and being completely portable with the provision of pneumatic tires 322 and provision for towing 324. Cables 328 for connection to the transit under test and for connection to an input power supply may be looped around fittings on enclosure 320, when not in use, or may be stored in a drawer compartment such as 330.

Accordingly, there has been provided a testing system for motor driven apparatus which allows the apparatus to be tested dynamically without the requirement of an actual run. The apparatus can be tested quickly and accurately with a high degree of confidence without the requirement of high voltages and high currents. Having the characteristics of the motor means to be replaced, the testing system finds a wide field of use and is of particular advantage in the testing of rapid transit cars.

I claim as my invention:

1. A testing system for electric motor driven apparatus having motor means, a power source for supplying an input voltage to said motor means, means for sensing motor current, a controller and current control means responsive to sensed motor current for controlling said motor means, comprising:
   a. a test power supply for generating a voltage having a predetermined relationship to said input voltage;
   b. means for replacing said power source with said test power supply;
   c. simulated motor means;
   d. means for replacing said electric motor means with said simulated motor means such that said simulated motor means is coupled to said test power source through said current control means; and
   e. means for scaling sensed simulated motor current for providing said controller with a sensed current equivalent to normal operation.

2. A system according to claim 1 wherein:
   a. said simulated motor means includes a first section and a second section;
   b. said first section being for simulation of a first motor means of said apparatus;
   c. said second section being for simulation of a second motor means of said apparatus.

3. A system according to claim 2 wherein:
   a. said first section includes means for simulating a plurality of motors; and
   b. said second section includes means for simulating a plurality of motors.

4. A system according to claim 2 which includes
   a. circuit means common to both said first and second sections for simulating resistive forces acting on said electric motor driven apparatus.

5. A system according to claim 1 which includes
   a. input means connectable with said controller for commanding modes of operation of said apparatus.

6. A system according to claim 1 wherein said controller includes a plurality of relays, the system additionally including:
   a. a second voltage supply connectable with said controller for supplying operating voltage to said relays.

7. A system according to claim 1 which includes
   a. a readout means operably connected to said simulated motor means for providing an indication of motor parameters when said testing system is connected to said motor driven apparatus.

8. A system according to claim 1 which includes
   a. a mobile carrier;
   b. said testing system being mounted on said carrier whereby said testing system may be movably positioned relative to said apparatus.

9. A system according to claim 1 which includes
   a. computer means operable to initiate various modes of operation of said apparatus;
   b. said computer means being operably connected with said simulated motor means for receiving and analyzing simulated motor means parameters.

10. A system according to claim 1 wherein:
    a. the ratio of the output voltage of said power source to the output voltage of said test power supply is at least 50:1.

11. Apparatus for simulating multiple electric motors which are coupled to drive a common load, comprising in combination;
    a. at least first and second circuits, each including at least an inductor, a resistor and a variable voltage source coupled in series;
    b. at least second and third circuits respectively responsive to the electric current flowing in said first and second circuits and for generating in response thereto first and second signals respectively indicative of the magnetic field produced by first and second electric motors;
    c. at least a fourth circuit for generating a third signal indicative of the angular velocity of said first and second electric motors; and
    d. at least fifth and sixth circuits selectively coupled to said second, third and fourth circuits for generating first and second control signals which respectively determine the amplitude of the voltage generated by said variable voltage sources.

12. Apparatus in accordance with claim 11 further including means for generating signals indicative of the velocity related losses in said first and second electric motors.

13. Apparatus in accordance with claim 12 further including means for simulating the load coupled to said first and second motors.

* * * * *